(12) United States Patent
Li

(10) Patent No.: US 7,537,480 B2
(45) Date of Patent: May 26, 2009

(54) MOUNTING APPARATUS FOR FAN

(75) Inventor: Zhan-Yang Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/861,314

(22) Filed: Sep. 26, 2007

(65) Prior Publication Data

US 2009/0016906 A1 Jan. 15, 2009

(30) Foreign Application Priority Data

Jul. 12, 2007 (CN) .................... 2007 2 0200649 U

(51) Int. Cl.
*H01R 13/00* (2006.01)
(52) U.S. Cl. ....................................... 439/485
(58) Field of Classification Search ................ 439/485, 439/894, 247; 361/695, 694, 683; 454/184
See application file for complete search history.

(56) References Cited

U.S. PATENT DOCUMENTS

| 6,373,698 | B1 * | 4/2002 | Christensen ................ 361/695 |
| 6,556,437 | B1 * | 4/2003 | Hardin ....................... 361/687 |
| 6,808,411 | B2 | 10/2004 | Chen |
| 6,999,313 | B2 | 2/2006 | Shih |

* cited by examiner

*Primary Examiner*—Alexander Gilman
(74) *Attorney, Agent, or Firm*—Frank R. Niranjan

(57) ABSTRACT

A mounting apparatus for a fan (30) includes a chassis (10), and a locking member (40). The chassis includes a bottom plate (12), two parallel installing plates (22, 24) perpendicularly secured on the bottom plate, and two parallel partition plates (26) perpendicularly secured between the installing plates. The partition plates are perpendicular to the bottom plate. One of the plates defines a cutout (264) offset from a middle of an edge thereof. The locking member engages with the one plate for securing the fan between the plates. A positioning block (424) is formed on the locking member, and engages in the cutout of the one plate for inserting the fan between the plates along a predetermined direction.

6 Claims, 2 Drawing Sheets

MOUNTING APPARATUS FOR FAN

CROSS-REFERENCE TO RELATED APPLICATION

This application is cross-referenced to a pending application Ser. No. 11/309,927, filed on Oct. 27, 2006, and assigned to the same assignee. Disclosure of the above-identified application is incorporated herein by reference.

BACKGROUND

1. Technical Field

The present invention relates to mounting apparatuses, and more particularly to a mounting apparatus for a fan.

2. General Background

A plurality of fans is desired in a computer chassis for dissipating heat generated by electronic devices secured in the computer chassis. In order to secure the fans, two parallel installing plates are perpendicularly mounted on a bottom plate of the computer chassis. A plurality of parallel partition plates is secured between the installing plates. The partition plates are perpendicular to the bottom plate and the installing plates. A plurality of locking members is provided to engage with the partition plates to secure the fans respectively between each two adjacent partition plates.

In order to effectively dissipate the heat in the computer chassis, the fans should be secured in a predetermined direction so that airflow generated by the fans flows in a same direction. However, structures or devices are not provided in mounting apparatuses as described above to ensure that the fans are installed in the predetermined direction.

What is needed, therefore, is a mounting apparatus with installation guides for ensuring a fan installed pointing in the correct direction.

SUMMARY

A mounting apparatus for a fan includes a chassis, and a locking member. The chassis includes a bottom plate, two parallel installing plates perpendicularly secured on the bottom plate, and two parallel partition plates perpendicularly secured between the installing plates. The partition plates are perpendicular to the bottom plate. One of the plates defines a cutout offset from a middle of an edge thereof. The locking member engages with the one plate for securing the fan between the plates. A positioning block is formed on the locking member, and engages in the cutout of the one plate for inserting the fan between the plates facing a predetermined direction.

Other advantages and novel features will be drawn from the following detailed description of embodiments with attached drawings, in which:

DETAILED DESCRIPTION

Figure 1:
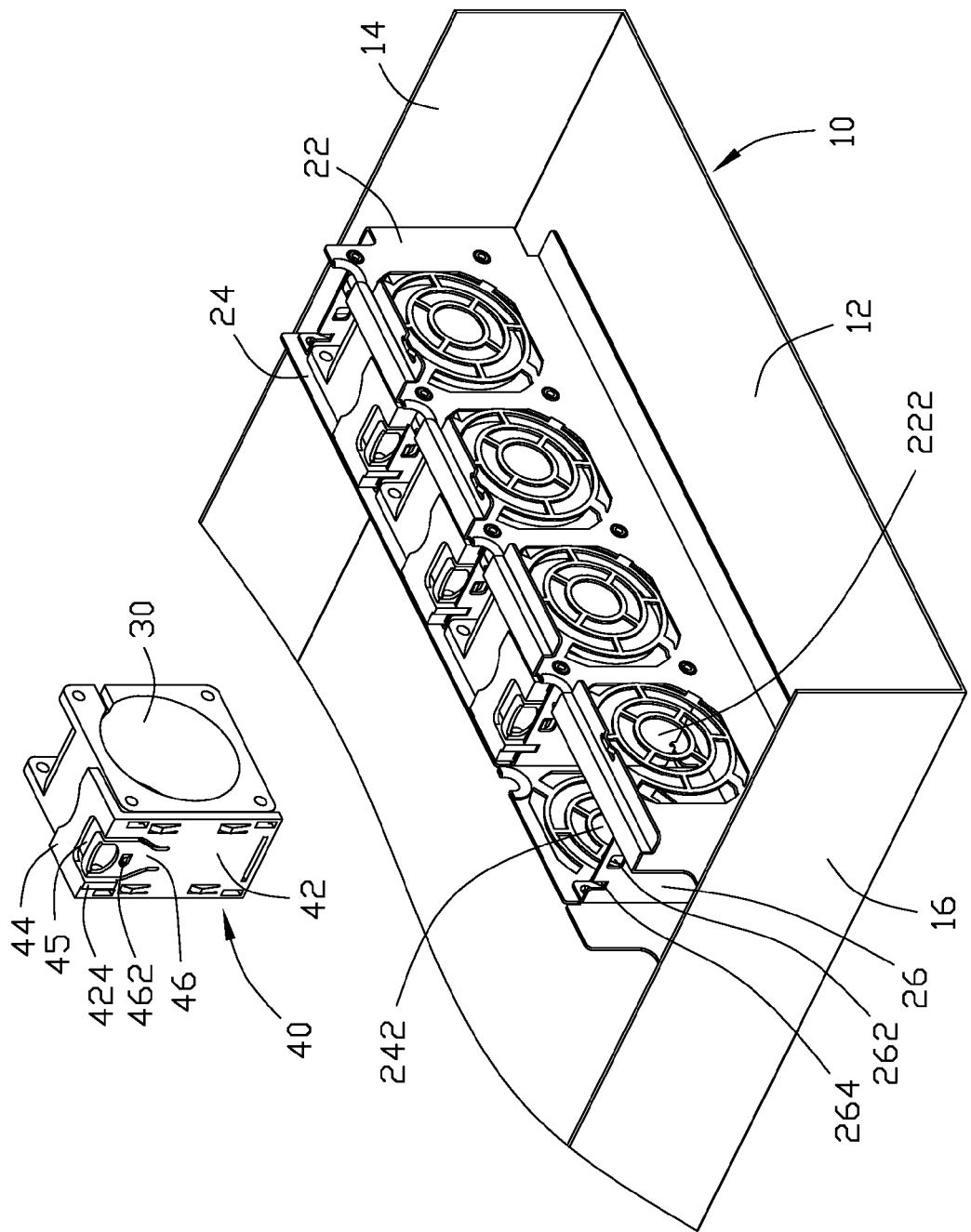
FIG. 1 is an exploded, isometric view of a mounting apparatus in accordance with a preferred embodiment of the present invention, the mounting apparatus including a chassis, and a locking member secured with a fan.

Referring to FIG. 1, a mounting apparatus for a fan 30 in accordance with an embodiment of the present invention includes a chassis 10, and a locking member 40. FIG. 1 shows a plurality of fans and locking members 40, but only one of the fans 30 and the locking members 40 is described as follows.

The chassis 10 includes a bottom plate 12, and two parallel side plates 14, 16 respectively perpendicularly bent from opposite edges of the bottom plate 12. Two parallel installing plates 22, 24 are secured on the bottom plate 12 between the side plates 14, 16, and perpendicular to the bottom plate 12 and the side plates 14, 16. Each of the installing plates 22, 24 defines a plurality of ventilation holes 222, 242 therein. The ventilation holes 222, 242 are in alignment with each other. A plurality of parallel partition plates 26 is installed between the installing plates 22, 24, perpendicular to the bottom plate 12 and the installing plates 22, 24. Ends of each partition plate 26 are respectively fixed to the installing plates 22, 24 between adjacent ventilation holes 222, 242. A locking hole 262 is defined in a middle portion of each of the partition plates 26, adjacent a top edge thereof. A cutout 264 is defined in the top edge of each of the partition plates 26, at one side of the corresponding locking hole 262, and is offset from the middle portion of each of the partition plates 26.

The locking member 40 is generally L-shaped, and includes a mounting portion 42 secured on one side of a conventional fan 30, and a bent portion 44 perpendicularly bent from a top edge of the mounting portion 42 and positioned on an adjacent side of the fan 30. A positioning block 424 protrudes from the mounting portion 42 adjacent a top edge and near one of opposite side edges thereof, for inserting in the cutout 264 of each partition plate 26. A through opening 45 is defined in the mounting portion 42 and the bent portion 44. A resilient locking portion 46 extends up from a bottom edge of the through openings 45, and a free end thereof is bent into the through opening 45 of the bent portion 44. A locking tab 462 with a slanted surface formed at a bottom portion thereof protrudes from the locking portion 46 of the mounting portion 42, corresponding to the locking hole 262 of each partition plate 26.

Figure 2:
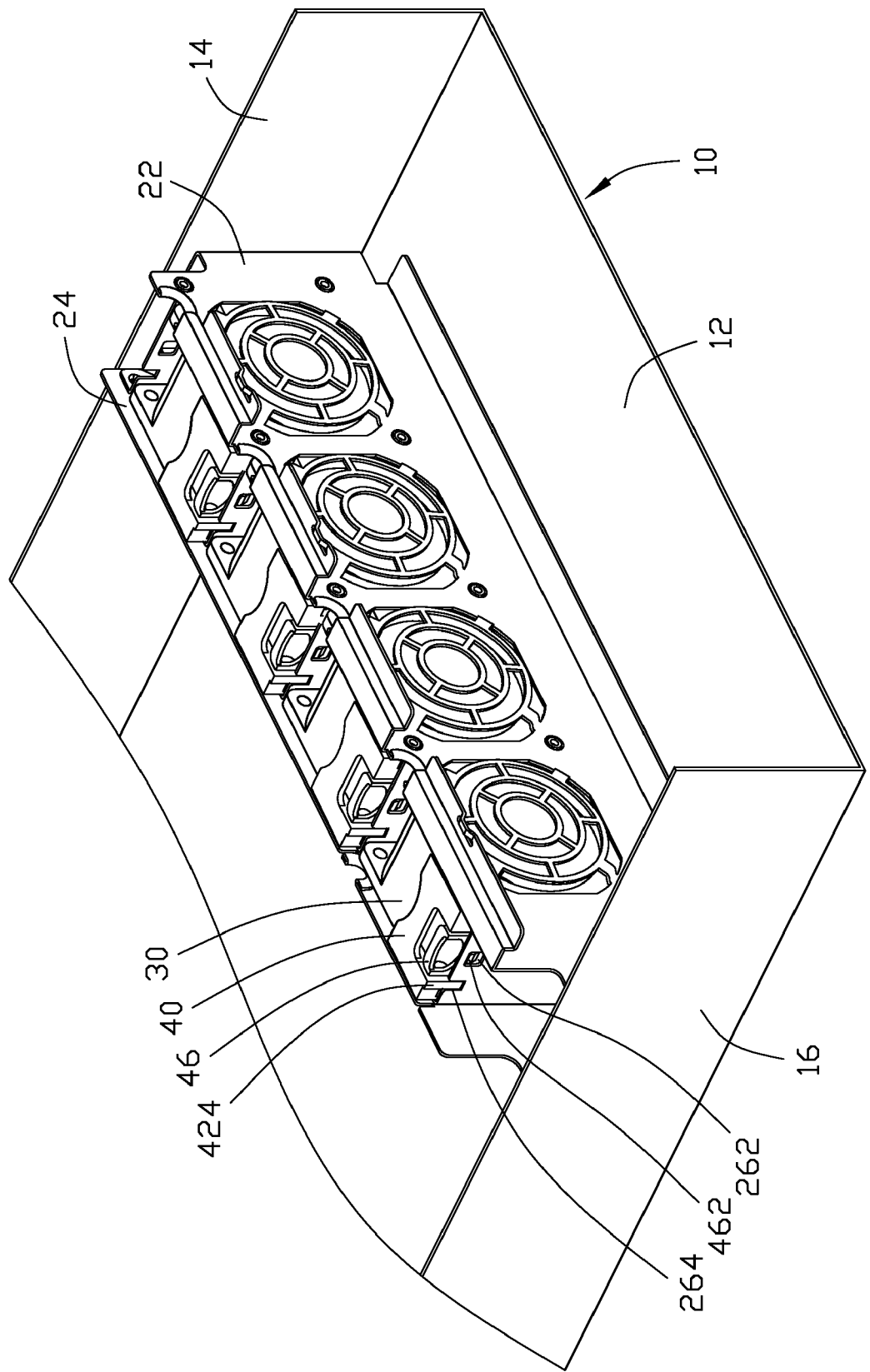
FIG. 2 is an assembled view of FIG. 1.

Referring also to FIG. 2, in assembly of the fan 30, the fan 30 together with the locking member 40, which is stably secured on the fan 30, is inserted into a space between two adjacent partition plates 26. The positioning block 424 of the locking member 40 aligns with the cutout 264 of the corresponding partition plate 26. When the slanted surface of the locking tab 462 abuts against the top edge of the partition plate 26, the fan 30 is exerted to further insert into the space. The top edge of the partition plate 26 presses the slanted surface of the locking tab 462 to resiliently deform the locking portion 46 towards the fan 30, so that the locking tab 462 can pass across the top edge of the space plate 26. When the locking tab 462 aligns with the locking hole 262 of the partition plate 26, the locking portion 46 rebounds to engage the locking tab 462 into the locking hole 262 of the partition plate 26. The fan 30 together with the locking member 40 is thereby secured into the space. At this time, the positioning block 424 is inserted into the cutout 264 of the partition plate 26.

In removing the fan 30, the locking portion 46 of the locking member 40 is urged to resiliently deform to disengage the locking tab 462 from the locking hole 262 of the partition plate 26. The fan 30 together with the locking member 40 can be thus taken out from the space between adjacent partition plates 26.

In this embodiment, engagement between the positioning block 424 of the locking member 30 and the cutout 264 of the corresponding partition plate 26 can ensure a correct direction of the fan 30 when installed. If the fan 30 is inserted into the space between adjacent partition plates 26 in a direction reverse to the correct direction, the positioning block 424 of the locking member 40 would not align with the cutout of the partition plate 26. Therefore, the fan 30 together with the locking member 40 cannot be inserted into the space incorrectly because the positioning block 424 is blocked by the top edge of the partition plate 26.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for a fan, comprising:
a chassis comprising a bottom plate, two parallel installing plates perpendicularly secured on the bottom plate, and two parallel partition plates perpendicularly secured between the installing plates and perpendicular to the bottom plate, one of the plates defining a cutout offset from a middle of an edge thereof; and
a locking member engaged with the one plate for securing the fan between the plates, a positioning block formed on the locking member, the positioning block engaging in the cutout of the one plate for inserting the fan between the plates along a predetermined direction;
wherein the one plate defines a locking hole therein, and a locking tab protrudes from the locking member for engaging in the locking hole to secure the fan between the plates;
wherein the locking member comprises a mounting portion secured on the fan, and the positioning block protrudes from the mounting portion;
wherein the locking member further comprises a bent portion bent from the mounting portion, the locking member defining a through opening in the mounting portion and the bent portion, a resilient locking portion extending from the mounting portion into the through opening, the locking tab being formed on the locking portion.

2. The mounting apparatus as described in claim 1, wherein the locking tab protrudes from a middle portion of the locking portion.

3. The mounting apparatus as described in claim 1, wherein the positioning block is positioned at one side of the through opening.

4. A fan assembly comprising:
a chassis comprising a bottom plate, two parallel installing plates perpendicularly secured on the bottom plate, and a plurality of parallel partition plates perpendicularly secured between the installing plates and perpendicular to the bottom plate, the bottom plate, the installing plates, and the partition plates cooperatively forming a plurality of receiving rooms, each of the partition plates having a slot exposed at a top edge and offset from a middle of the top edge thereof, and a locking hole;
a plurality of fans received in the receiving rooms; and
a plurality of locking members attached to the respective fans, each of the locking members having a positioning protrusion engaging in the slot of the corresponding partition plate, and a deformable locking portion resiliently abutting against the partition plate, the locking portion having a locking tab formed thereon engaged in the locking hole of the partition plate thereby blocking the fan moving in a direction away from the bottom plate;
wherein each of the locking members comprises a mounting portion and a bent portion bent from the mounting portion, the locking member defining a through opening in the mounting portion and the bent portion, the locking portion extending from the mounting portion into the through opening.

5. The mounting apparatus as described in claim 4, wherein the locking tab protrudes from a middle portion of the locking portion.

6. The mounting apparatus as described in claim 4, wherein the locking hole is defined in a middle of each of the partition plates.

* * * * *